United States Patent [19]
Troemner et al.

[11] 4,371,063
[45] Feb. 1, 1983

[54] PARK-LOCK MECHANISM

[75] Inventors: James O. Troemner; Peter D. Wetrich, both of Cedar Falls; William A. Volz, Waterloo, all of Iowa

[73] Assignee: Deere & Company, Moline, Ill.

[21] Appl. No.: 200,862

[22] Filed: Oct. 27, 1980

[51] Int. Cl.³ .............................................. G05G 5/10
[52] U.S. Cl. ..................................... 192/4 A; 74/470; 74/473 R; 74/477; 192/109 A
[58] Field of Search ................. 192/3.63, 4 A, 109 A; 74/470, 473 R, 477, 483 R, 878

[56] References Cited

U.S. PATENT DOCUMENTS

| | | | |
|---|---|---|---|
| 1,304,955 | 5/1919 | Fowler | 74/470 X |
| 1,427,684 | 8/1922 | Grieves | 74/470 |
| 2,039,553 | 5/1936 | Roehrl | 192/4 A |
| 3,952,838 | 4/1976 | Osten et al. | 74/470 X |
| 4,022,077 | 5/1977 | Brewer et al. | 74/473 R |
| 4,170,149 | 10/1979 | Koegel | 74/470 X |

FOREIGN PATENT DOCUMENTS

| | | | |
|---|---|---|---|
| 54-31858 | 3/1979 | Japan | 192/3.63 |
| 1328215 | 8/1973 | United Kingdom | 74/483 R |

*Primary Examiner*—Allan D. Herrmann

[57] ABSTRACT

A park-lock mechanism for a vehicle equipped with a transmission operatively controlled by a pair of shift levers. One of the shift levers is a range selector shift lever and the other is a gear speed shift lever. The park-lock mechanism is comprised of a spring-loaded capsule positioned on the range selector shift lever, and an interlocking mechanism which is mounted adjacent to both of the shift levers. The spring-loaded capsule provides a means for preloading the range selector shift lever into the park position only when the interlocking mechanism has the transmission positioned in its lowest gear speed.

13 Claims, 4 Drawing Figures

PARK-LOCK MECHANISM

BACKGROUND OF THE INVENTION

1. Field of the Invention

This invention relates to a park-lock mechanism for a vehicle and more particularly to a park-lock mechanism for agricultural tractors.

2. Description of the Prior Art

Normally, agricultural and industrial vehicles, especially those which utilize collar shift transmissions having a park-lock, do not have the ability to select the park position when the park-locking splines are not in alignment. Such vehicles also may not have a means for providing a visual indication that the shift lever is in the park position. Furthermore, the park engagement on many agricultural tractors does not require that the lowest speed position be engaged. When the lowest speed position is engaged, the park linkage forces on the transmission will be as low as possible, thereby ensuring that the disengaging forces acting on the transmission are at a minimum. Now, a park-lock mechanism has been invented which provides visual assurance to the operator as well as providing minimum forces on the transmission.

SUMMARY OF THE INVENTION

Briefly, this invention relates to a park-lock mechanism for a vehicle equipped with a transmission operatively controlled by a pair of shift levers. One of the shift levers being a range selector shift lever for selecting a plurality of range positions, including a park position, and the second shift lever being a gear speed shift lever for selecting a plurality of speed positions, including a low speed position. The park-lock mechanism comprises an interlocking means which is mounted to the vehicle adjacent to both the shift levers. This interlocking means enables the range selector shift lever to be placed in park only when the gear speed shift lever is positioned in the lowest speed location. In addition, the park-lock mechanism includes a spring-loaded capsule which joins an upper portion of the range selector shift lever to a lower portion of the range selector shift lever. This spring-loaded capsule enables the range selector shift lever to be spring-loaded as it is angularly positioned within the interlocking means even if the gear teeth within the transmission are not intermeshing.

The general object of this invention is to provide a park-lock mechanism for a vehicle which allows the operator to select the park position even when the locking splines within the transmission are not in alignment. A more specific object of this invention is to provide a park-lock mechanism for agricultural tractors which will provide visual assurance to the operator that the tractor is in park.

Another object of this invention is to provide a park-lock mechanism which minimizes the park linkage forces within the transmission by requiring that the low speed position be selected before the vehicle can be placed in park.

Still another object of this invention is to provide a park-lock mechanism which will make the operation of a vehicle safer.

Other objects and advantages of the present invention will become more apparent to those skilled in the art in view of the following description and the drawings.

DETAILED DESCRIPTION OF THE PREFERRED EMBODIMENT

Figure 1:
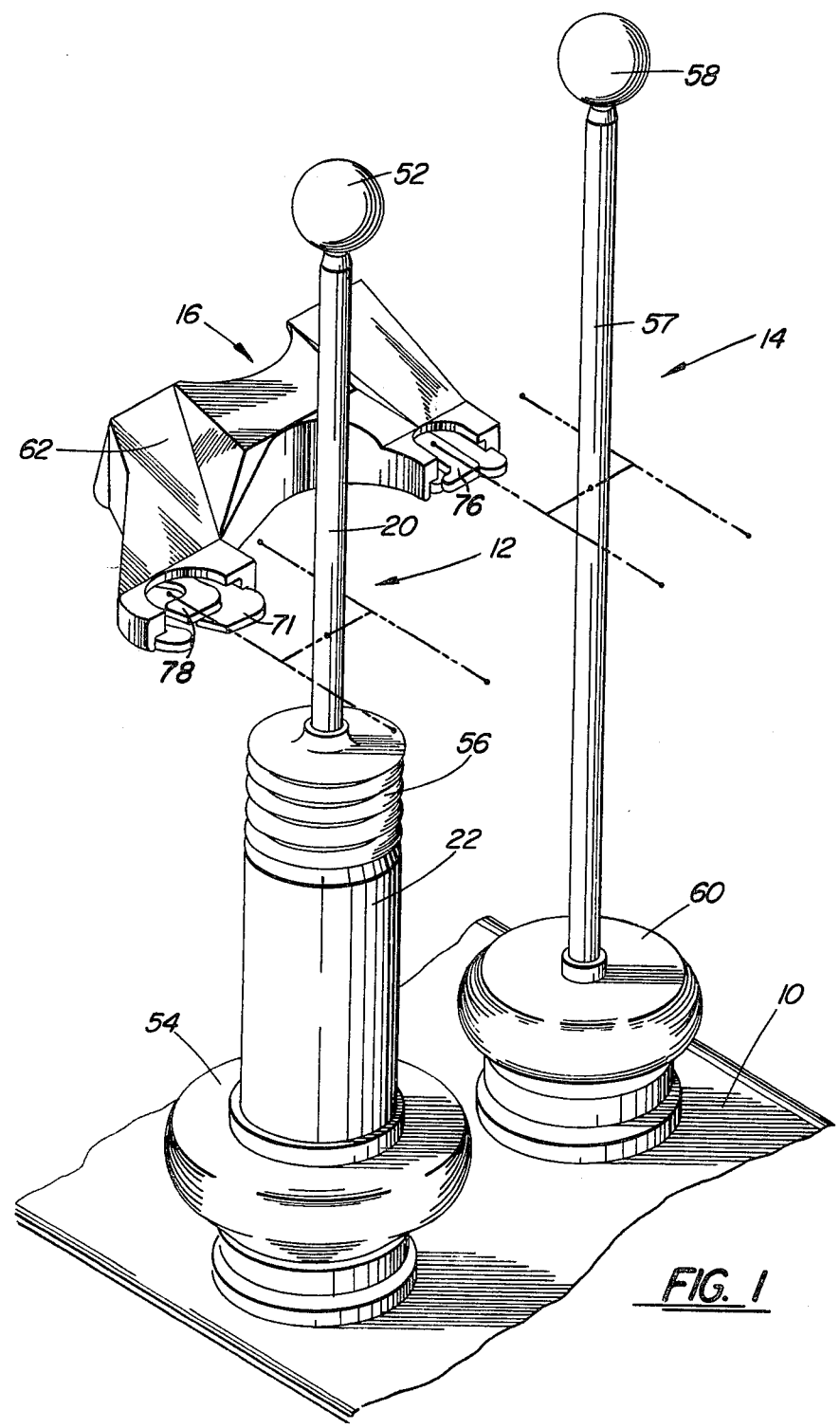
FIG. 1 is an assembly view of a park-lock mechanism.

Referring to FIG. 1, a park-lock mechanism for a vehicle is shown wherein the vehicle has a transmission housing 10 which encloses a standard shiftable transmission, such as a collar shift transmission. A pair of shift levers 12 and 14 extend upward and out from the transmission housing 10 to provide a means for shifting the transmission. The shift lever 12 is a range selector shift lever which is movable between a plurality of range positions, including a park position, a reverse position, and first and second forward positions. The second shift lever 14 is a gear speed shift lever which is movable between a plurality of speed positions, including a low speed position. The other speed positions can include speeds 1-4 or speeds 1-8, depending upon the configuration of the transmission. Positioned adjacent to the shift levers 12 and 14 is an interlocking mechanism 16. The interlocking mechanism 16 contains a means for interlocking and securing the range selector shift lever 12 in the park position when the gear speed shift lever 14 is in its lowest gear speed.

Figure 2:
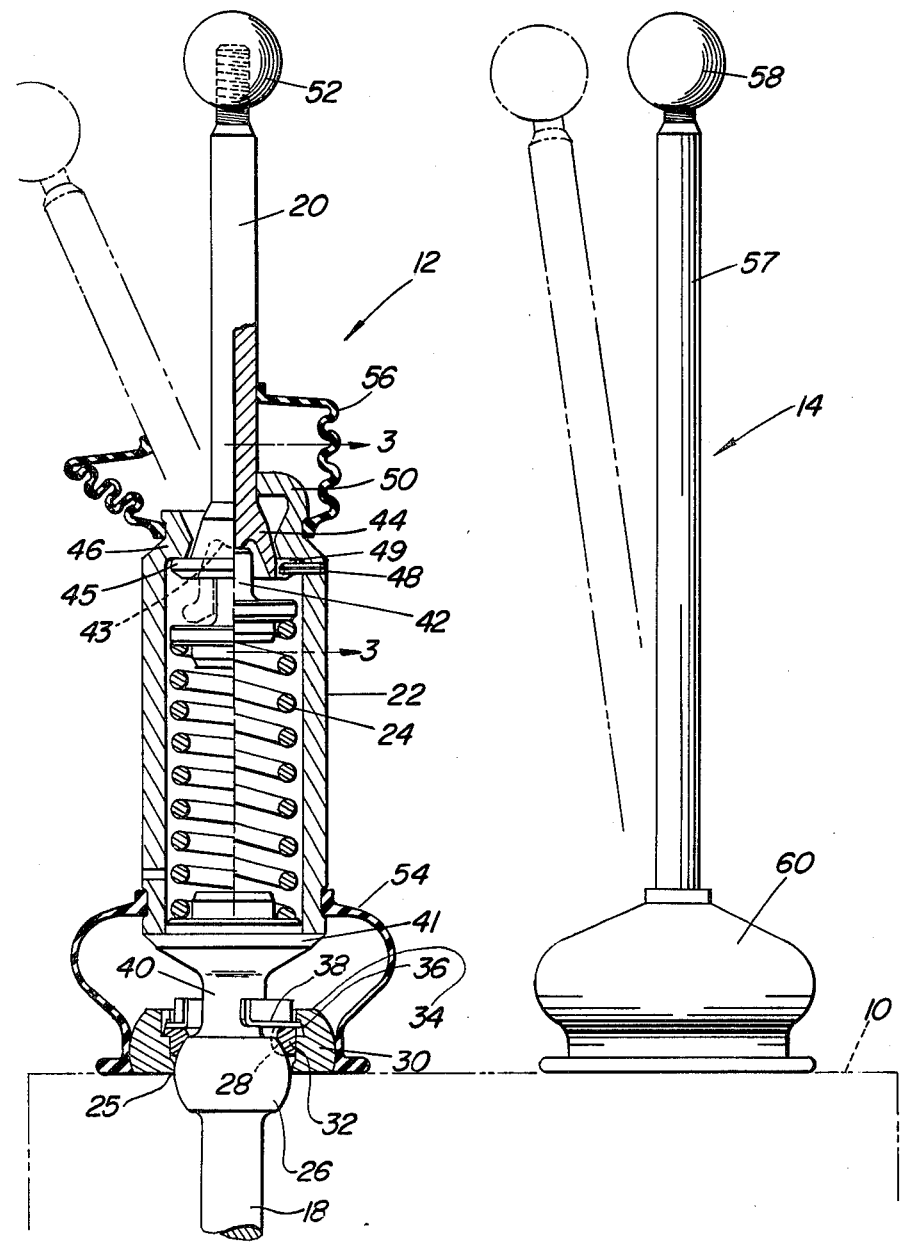
FIG. 2 is a view of the two shift levers with a partial sectional view of the spring-loaded capsule on the range selector shift lever.
Figure 3:
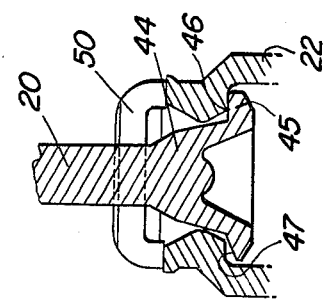
FIG. 3 is an enlarged view of FIG. 2 along line 3—3.

Referring now to FIGS. 2 and 3, the range selector shift lever 12 is comprised of a lower portion 18 and an upper portion 20. The lower portion 18 is connected to the upper portion 20 by a spring-loaded capsule 22 containing a coil spring 24. The lower portion 18 passes through an aperture 25 in the transmission housing 10 and engages with various gears through shift rods and shift linkages. The internal linkages within the transmission will not be described as they are conventionally known to those skilled in the transmission art.

The lower portion 18 of the range selector shift lever 12 protrudes above the transmission case 10 and expands into a circular collar 26. This circular collar 26 contains one or more slots, denoted as 28, which engage with a bearing 30 having a tab member 32. This tab member 32 prevents rotational movement of the lower portion 18 within the aperture 25.

The bearing 30, which is preferably metal, is held secure to the collar 26 at an upper portion 34. The upper portion 34 contains a slot 36 which holds a snap ring 38. The snap ring 38 surrounds a narrow neck 40 of the lower portion 18 and prevents axial movement of the lower portion 18 with respect to the transmission housing 10.

Located above the narrow neck 40 is a top surface 41 which is attached to the spring-loaded capsule 22. This spring-loaded capsule 22 enables the upper portion 20 of the range selector shift lever 12 to move angularly with respect to the lower portion 18. This angular movement is accomplished by a spring seat 42 which pilots on the upper end of the spring 24. The upper surface of the spring seat 42 contacts a spherical surface 43. The spherical surface 43 is located at the center of a second seat 44 which is attached to the bottom of the upper portion 20 of the range selector shift lever 12. This arrangement permits rolling contact between the spring seat 42 and the second seat 44 when the upper portion 20 of the range selector shift lever 12 is tilted. It also keeps the center of the spring loading forces on the central axis of the spring 24.

The second seat 44 contains a lip member 45 which abuts a shoulder 46 located on the spring-loaded capsule 22. This abutment restricts the upward movement of the second seat 44 within the spring-loaded capsule 22. A roll pin 48, which is positioned in a slot 49 on the spring-loaded capsule 22, is present to prevent rotational movement of the second seat 44 within the spring-loaded capsule 22. It should be noted that the roll pin 48 does not limit the pivotal action of the second seat 44. Other means for preventing rotational movement of the second seat 44 can also be employed if desired.

An angular surface 47, see FIG. 3, is formed in a portion of the lip member 45 approximately 90 degrees to the right of the fore-and-aft movement of the range selector shift lever 12. This angular surface 47 reduces the side forces required to hook the upper portion 20 of the range selector shift lever 12 into the interlocking mechanism 16. A more detailed description of this hooking action will be explained below.

An abutment means 50 is formed on the top of the spring-loaded capsule 22. This abutment means 50 contacts the upper shaft portion 20 of the range selector shift lever 12 and will assist the operator when the range selector shift lever 12 is pulled back towards the neutral position. The abutment means 50 will also prevent over-shifting from the park position to the second position as well as preventing the upper shaft portion 20 from being moved angularly in all directions with respect to the lower portion 18. Preferably, the abutment means 50 will limit the movement of the upper shaft portion 20 to 180 degrees with respect to keeping the lower portion 18 in one position. It should be noted that the force needed to compress the spring 24 is greater than the detent forces required to shift the transmission. For example, a force of only 5-7 pounds may be needed to shift the linkage within the transmission while a force of about 25 pounds may be needed to deflect the upper portion 20 of the range selector shift lever 12.

The upper portion 20 of the range selector shift lever 12 is topped off by a knob 52 which permits the operator of the vehicle to easily grasp the range selector shift lever 12 and move it in a given direction. A lower and an upper dust boot 54 and 56 respectively, are also utilized to cover the lower area containing the bearing 30 and to cover the upper area of the spring-loaded capsule 22.

The gear speed shift lever 14, which also passes into the transmission housing 10, extends upward therefrom in approximately a parallel arrangement with the range selector shift lever 12. This gear speed shift lever 14 is a single shaft 57 topped off by a knob 58 and having a dust boot 60 positioned as shown. The knob 58 and the dust boot 60 serve the same purposes as the knob 52 and the dust boots 54 and 56 which were described above.

Figure 4:
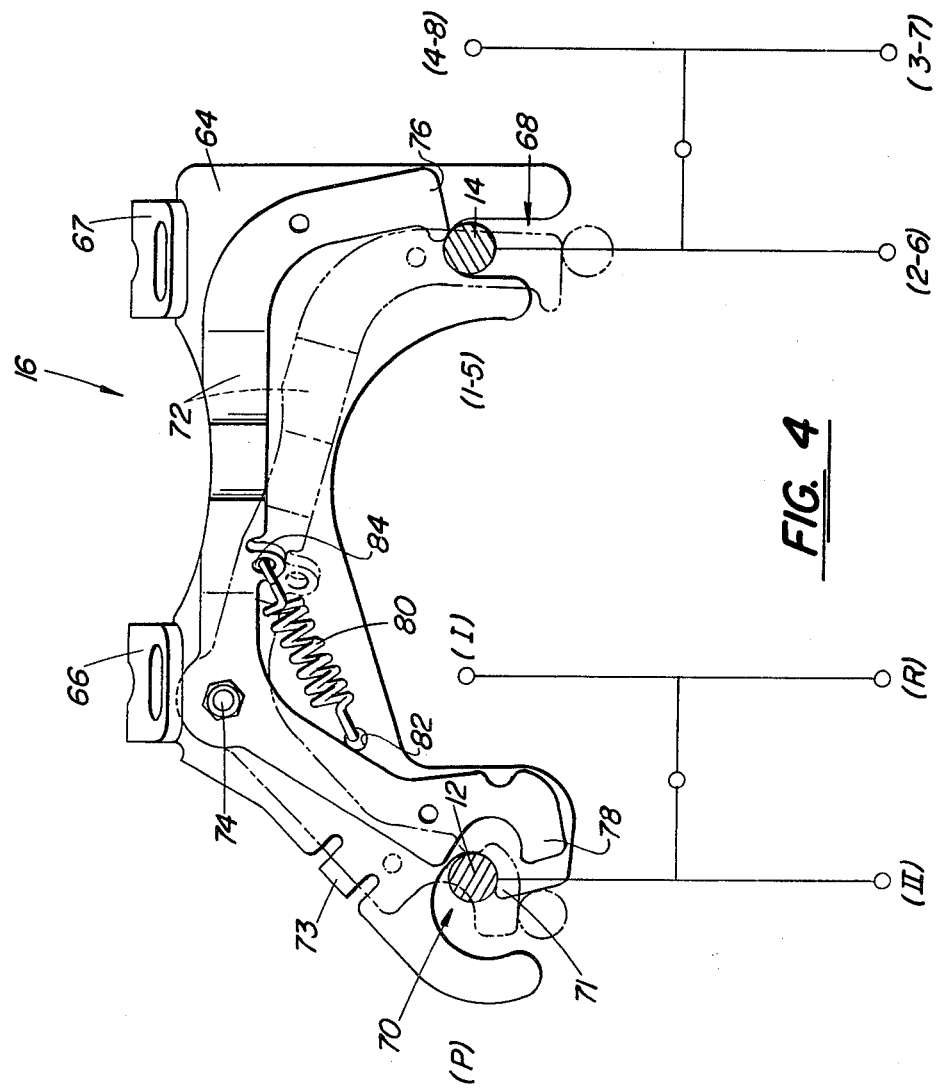
FIG. 4 is a top view of the interlock portion of the park-lock mechanism with the cover plate removed.

Referring now to FIG. 4, the interlocking mechanism 16 is shown with a cover plate 62 removed. The interlocking mechanism 16 is made up of a bracket 64, a lever 72 and biasing means 80. The bracket 64 is a relatively flat member having one or more attachment means which mount onto the frame of the vehicle, two of which are shown as 66 and 67. The bracket 64 also contains a first or slotted end 68, a second or bifurcated hooked end 70, and a stop 73. The first or slotted end 68 receives the gear speed shift lever 14 when the gear speed shift lever 14 is positioned in its lowest possible gear speed. This lowest possible gear speed is indicated by the upper left hand leg of the H-shaped configuration on the right side of the drawing. The bifurcated hooked end 70, having a hook tip 71 receives the range selector shift lever 12 when the range selector shift lever 12 is positioned in the park position. The park position is indicated by the upper left hand leg of the H-shaped configuration on the left side of the drawing. The stop 73, which is distally positioned to the bifurcated hooked end 70 is to position the lever 72 such that it overlaps the bifurcated hooked end 70 when the lever 72 is in its biased or first position.

The lever 72 which is pivotally mounted to the bracket 64 by a pin 74, has a first end 76 and a second end 78 and is movable between a first position and a second position. In the first position, the first end 76 is positioned over the slotted end 68 of the bracket 64 and the second end 78 is positioned over the bifurcated hooked end 70 of the bracket 64. In the second position, which occurs when the gear speed shift lever 14 is shifted into its lowest speed position, the first end 76 is no longer overlapping the slotted end 68 of the bracket 64 and the second end 78 is no longer overlapping the bifurcated hooked end 70 of the bracket 64. The positioning of the lever 72 on the bracket 64 is by the biasing means 80, which can be a spring. The biasing means 80 urges the lever 72 to the first position wherein the lever 72 engages the stop 73. The biasing means 80 can be secured between the bracket 64 and the lever 72 by apertures 82 and 84, respectively, into which ends of the biasing means 80 would hook.

OPERATION

The park-lock mechanism operates as follows. Starting with the transmission in a neutral position, the operator places both the range selector shift lever 12 and the gear speed shift lever 14 in a desired position. This shifting of the shift levers 12 and 14 permits the vehicle to be driven in a given direction at a given speed. When it is desired to stop the vehicle and place the vehicle in park, the operator would first shift the gear speed shift lever 14 into the lowest speed position possible. This action causes the gear speed shift lever 14 to enter the slotted end 68 of the bracket 64. As the gear speed shift lever 14 enters the slotted end 68 of the bracket 64, it will abut the first end 76 of the lever 72 and pivot the lever 72 on the pin 74. This will cause the lever 72 to move backwards against the force of the biasing means 80. When the gear speed shift lever 14 is fully inserted into the slotted end 68, it will be positioned approximately at the inner end of the slotted end 68. In this position, the lever 72 will have pivoted such that the second end 78 will no longer overlap the bifurcated hooked end 70 of the bracket 64. With the bifurcated hooked end 70 exposed, the operator then shifts the range selector shift lever 12 into the park position. In order to shift the range selector shift lever 12 into this park position, the operator must forcefully move the upper portion 20 of the range selector shift lever 12 around and into the bifurcated hooked end 70. This movement is necessary in order to clear the hook tip 71. Once both of the shift levers 12 and 14 are positioned within the slotted and bifurcated hooked ends, 68 and 70 respectively, the operator can be assured that the vehicle will not move. This assurance is provided by the fact that the range selector shift lever 12 is preloaded by the spring-loaded capsule 22 so that even when the gear teeth on the gears within the transmission do not intermesh, the force of the preloading will cause the teeth to intermesh with the slightest amount of movement or vibration of the vehicle. This means that the gear teeth will always be meshing or will quickly become meshed when the range selector shift lever 12 is in the park position.

The operator can also be assured that the range selector shift lever 12 will not jump out of the park position for it is retained in place by both the shape of the bifurcated hooked end 70, the hooked tip 71, and by the force required to move the range selector shift lever 12 to the side before the range selector shift lever 12 can be released from the bifurcated hooked end 70.

When the operator is ready to take the vehicle out of the park position, the operator forceably moves the range selector shift lever 12 to the left and then rearwardly as shown in FIG. 4. The range selector shift lever 12 can then be placed in either the first or the second forward position, in neutral or in the reverse position. The operator is not required to shift the gear speed shift lever 14 at this time unless there is a desire to shift the vehicle into a higher gear speed. With both of the shift levers 12 and 14 removed from the bifurcated hooked end 70 and the slotted end 68 of the bracket 64, the lever 72 will be returned to its first position by the biasing means 80 wherein the first end 76 and the second end 78 will overlap the slotted end and the bifurcated hooked end, 68 and 70 respectively. Subsequent shifting of the two shift levers, 12 and 14, can be made without affecting the interlocking mechanism 16 unless the lowest speed position is entered by the gear speed shift lever 14. The range selector shift lever 12 is always prevented from entering the bifurcated hooked end 70 except when the gear speed shift lever 14 is engaged in the slotted end 68. This facet of the invention provides the visual assurance to the operator that when the range selector shift lever 12 is in the park position, the vehicle is truly stationary.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A park-lock mechanism for a transmission operatively controlled by a range selector shift lever and a gear speed shift lever, said range selector shift lever being movable between a plurality of range positions, including a park position and said gear speed shift lever being movable between a plurality of speed positions, including a low speed position, said park-lock mechanism comprising:
    (a) means positioned on said range selector shift lever for dividing said range selector shift lever into an upper portion and a lower portion, said means enabling said upper portion to be angularly tilted irrespective of moving said lower portion; and
    (b) interlocking means mounted adjacent to said two shift levers for locking said range selector shift lever in said park position after said gear speed shift lever has been placed in said low speed position thereby providing visual assurance that said transmission is in park.

2. A park-lock mechanism for a vehicle equipped with a transmission operatively controlled by a range selector shift lever and a gear speed shift lever, said range selector shift lever being movable between a plurality of range positions, including a park position and said gear speed shift lever being movable between a plurality of speed positions, including a low speed position, said park-lock mechanism comprising:
    (a) a spring-loaded capsule positioned on said range selector shift lever, said spring-loaded capsule dividing said range selector shift lever into an upper portion and a lower portion and capable of angularly tilting said upper portion irrespective of moving said lower portion; and
    (b) interlocking means mounted adjacent to said two shift levers for locking said range selector shift lever in said park position after said gear speed shift lever has been placed in said low speed position, said interlocking means comprising a bracket having a slotted end and a bifurcated hooked end, said slotted end capable of receiving said gear speed shift lever and said bifurcated hooked end capable of receiving said range selector shift lever; a lever pivotably mounted to said bracket having a first end and a second end, said first end overlapping said slotted end and said second end overlapping said bifurcated hooked end; said lever movable between a first and a second position by engagement with said gear speed shift lever, said first position blocking movement of said range selector shift lever to said park position and said second position permitting movement of said range selector shift lever to said park position; and bias means normally retaining said lever in said first position.

3. The park-lock mechanism of claim 2 wherein said spring-loaded capsule contains a coil spring.

4. The park-lock mechanism of claim 2 wherein said spring-loaded capsule enables said upper portion of said range selector shift lever to be preloaded into said position even when mating gears in said transmission are not fully meshing.

5. A park-lock mechanism for a vehicle equipped with a transmission operatively controlled by two shift levers, one being a range selector shift lever movable between a plurality of range positions, including a park position, and the other being a gear speed shift lever movable between a plurality of speed positions, including a low speed position, said park-lock mechanism comprising:
    (a) a spring-loaded capsule positioned on said range selector shift lever, said spring-loaded capsule dividing said range selector shift lever into an upper portion and a lower portion and capable of spring-loading said upper portion into said park position even when said lower portion does not correspond to intermeshing gears within said transmission;
    (b) a bracket mounted on said vehicle adjacent to both of said shift levers, said bracket having a slotted end and a bifurcated hooked end, said slotted end capable of receiving said gear speed shift lever and said bifurcated hooked end capable of receiving said range selector shift end;
    (c) a lever pivotably mounted to said bracket having a first end and a second end, said first end overlapping said slotted end and said second end overlapping said bifurcated hooked end, said lever movable between a first and a second position by engagement with said gear speed shift lever, said first position blocking movement of said range selector shift lever to said park position and said second position permitting movement of said range selector shift lever to said park position; and (d) bias means normally retaining said lever in said first position.

6. The park-lock mechanism of claim 5 wherein said bias means is a spring.

7. The park-lock mechanism of claim 5 wherein a cover plate is attached to said bracket.

8. A park-lock mechanism for a transmission operatively controlled by two shift levers, one being a range selector shift lever movable between a plurality of range positions, including a park position, and the other being a gear speed shift lever movable between a plurality of speed positions, including a low speed position, said park-lock mechanism comprising:

(a) lever means pivotally mounted for movement relative to said two shift levers for movement between first and second positions, said first position blocking movement of said range selector shift lever to said park position and said second position permitting movement of said range selector shift lever to said park position, said lever means including a first end and a second end, said first end engageable by said gear speed shift lever to move said lever means to said second position as said gear speed shift lever is moved to said low speed position; and (b) means normally, yieldably biasing said lever means to said first position.

9. A park-lock mechanism for a transmission having a range selector shift lever and a gear speed shift lever, said range selector shift lever movable between a plurality of range positions, including a park position and said gear speed shift lever movable between a plurality of speed positions, including a low speed position, said park-lock mechanism comprising:

(a) first means for releasably retaining said range selector shift lever in said park position;

(b) second means mounted for movement relative to said transmission between a first position and a second position, said first position blocking movement of said range selector shift lever to said park position and said second position permitting movement of said range selector shift lever to said park position, said second means responsive to movement of said gear speed shift lever to said low speed position to move to said second position; and (c) means yieldably biasing said second means to said first position.

10. The park-lock mechanism of claim 9 wherein said first means includes a fixed hook member extending across the normal path of movement of said range selector shift lever and means for permitting a portion of said range selector shift lever to be forceably moved out of said normal path of movement around and into said fixed hook member.

11. The park-lock mechanism of claim 10 wherein said means for permitting a portion of said range selector shift lever to be forceably moved out of said normal path of movement is a spring-loaded capsule positioned between an upper portion and a lower portion of said range selector shift lever.

12. In a multi-speed, multi-range transmission having a range selector shift lever movable between a plurality of range positions, including a park position, and a gear speed shift lever movable between a plurality of speed positions, including a low speed position, a park-lock mechanism comprising:

(a) first means joining an upper and a lower portion of said range selector shift lever for yieldably biasing said upper and lower portions to and normally holding said upper and lower portions in a fixed relative position with respect to each other while permitting said upper portion to be forceably moved from said fixed position relative to said lower portion;

(b) second means extending across the normal path of movement of said upper portion of said range selector shift lever as said range selector shift lever is moved towards said park position whereby said upper portion of said range selector shift lever must be forceably moved from said fixed position relative to said lower portion to move around said first means as said range selector shift lever is moved to said park position, said second means including means for releasably retaining said upper portion of said range selector shift lever in said park position;

(c) third means mounted for movement relative to said transmission between a first position and a second position, said first position blocking movement of said upper portion of said range selector shift lever around and into said second means and said second position permitting movement of said upper portion of said range selector shift lever around and into said second means, said third means responsive to movement of said gear speed shift lever to said low speed position to move to said second position; and (d) means yieldably biasing said third means to said first position.

13. In a multi-speed transmission having a plurality of gears with gear teeth shifted into intermeshing engagement by a manual control lever movable between a plurality of positions, including a park position in which gear teeth are intermeshed, a park-lock mechanism comprising:

(a) means joining upper and lower portions of said manual control lever for yieldably biasing said upper and lower portions to and normally holding said upper and lower portions in a fixed relative position with respect to each other while permitting said upper portion to be forceably moved from said fixed position relative to said lower portion, said means including a spring-loaded capsule containing a spring which is normally axially aligned with said upper and lower lever portions, and an upper end of said spring contacting a spring seat which is in rolling contact with said upper portion of said lever; and (b) means engageable with said upper portion of said manual control lever for releasably holding said upper portion of said control lever in said park position whereby said upper portion of said manual control lever can be forceably moved to and retained in said park position even if said gear teeth to be engaged in said park position do not intermesh.

* * * * *

UNITED STATES PATENT AND TRADEMARK OFFICE
CERTIFICATE OF CORRECTION

PATENT NO. : 4,371,063

DATED : 1 February 1983

INVENTOR(S) : James O. Troemner; Peter D. Wetrich; William A. Volz

It is certified that error appears in the above-identified patent and that said Letters Patent is hereby corrected as shown below:

Page 1, line [75], change order of inventors names to read
-- Peter D. Wetrich; James O. Troemner; William A. Volz --.

Signed and Sealed this

Twenty-seventh Day of December 1983

[SEAL]

Attest:

GERALD J. MOSSINGHOFF

Attesting Officer    Commissioner of Patents and Trademarks